May 21, 1957     E. C. RHYNE, JR     2,793,339

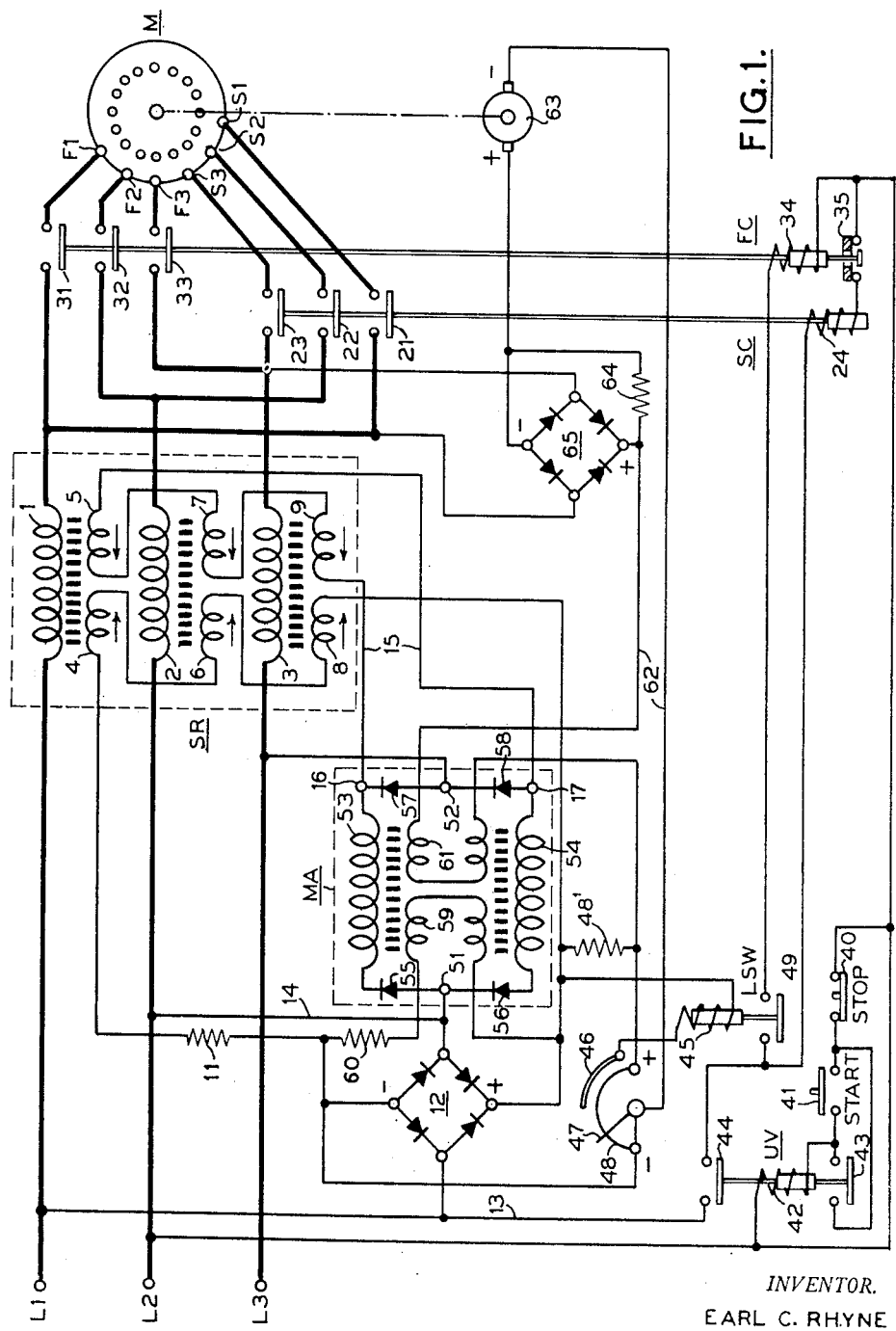

MULTI-SPEED INDUCTION MOTOR CONTROL SYSTEMS

Filed May 9, 1956     3 Sheets-Sheet 2

*INVENTOR.*
EARL C. RHYNE JR.

United States Patent Office 2,793,339
Patented May 21, 1957

2,793,339

MULTI-SPEED INDUCTION MOTOR CONTROL SYSTEMS

Earl C. Rhyne, Jr., East Pepperell, Mass., assignor to Cline Electric Manufacturing Company, Chicago, Ill., a corporation of Delaware Application May 9, 1956, Serial No. 583,800

9 Claims. (Cl. 318—224)

My invention relates to systems for controlling the speed of alternating-current induction motors and, more particularly, to systems in which a variable impedance device, for instance a saturable reactor, is connected in the motor circuit and is controlled to vary its effective impedance for maintaining the motor speed at a desired value.

Such control systems are capable of regulating an induction motor so that it will run at a stable subsynchronous speed selected within the available speed range. In the known systems of this type, however, the efficiency of motor operation and the heating conditions of the motor leave much to be desired. This is because when the motor runs at a speed lower than the synchronous value, and hence operates with considerable slip, an amount of power proportional to the slip must be dissipated in the rotor circuits. For instance, when the regulated motor speed is 50% of the synchronous value, this being tantamount to 50% slip, just as much power must be dissipated as is usefully imparted to the motor shaft. The large power loss manifests itself as heat in the motor, or also in the external rotor circuit if the motor is of the wound-rotor type. To cope with the heating problem it has been necessary, as a rule, to use an oversized motor or a motor designed for special cooling.

It is an object of my invention, relating generally to induction-motor control systems of the above-mentioned type, to improve the efficiency of operation and to reduce heating in the motor or its associated power circuits, without foregoing the ability of continuous and stable regulation for selected subsynchronous speeds.

To this end, and in accordance with a feature of my invention, I provide the control system with a multi-speed induction motor selectively operable with one of a plurality of pole numbers so as to permit a choice between two or more synchronous speeds, I connect with the motor a variable electric device for regulating the motor speed to maintain a selected subsynchronous value or a value intermediate the available synchronous speeds; and I further make the switching from one to another pole number of the motor dependent upon a speed condition of the control system so that the motor, for operation at any selected subsynchronous or intermediate speed, will operate with the number of field poles that correspond to the next higher synchronous speed.

According to another feature of my invention, I provide the system with a plurality of contactors to selectively energize the motor for the respective different pole numbers and operate these contactors so that, during transition from one to another synchronous speed setting of the motor, the previously active contactor and the newly active contactor are temporarily closed simultaneously, thus providing for "closed-circuit transition" during an interval of time in which the variable impedance is effective to maintain stepless speed control. In a system according to the invention, the speed-controlling device, connected in the primary or secondary power circuit of the motor, may consist of any suitable voltage or impedance regulator such as a group of controllable gaseous discharge tubes, a variable transformer, or a saturable transformer. Preferable, however, are magnetically saturable reactance devices, particularly saturable reactors and magnetic amplifiers.

The foregoing and more specific objects, advantages and features of the invention will be apparent from the embodiments of motor control systems according to the invention illustrated on the drawing and described in the following. On the drawing:

Fig. 1 is the circuit diagram of a control system with a two-speed squirrel-cage motor.

Figure 3:
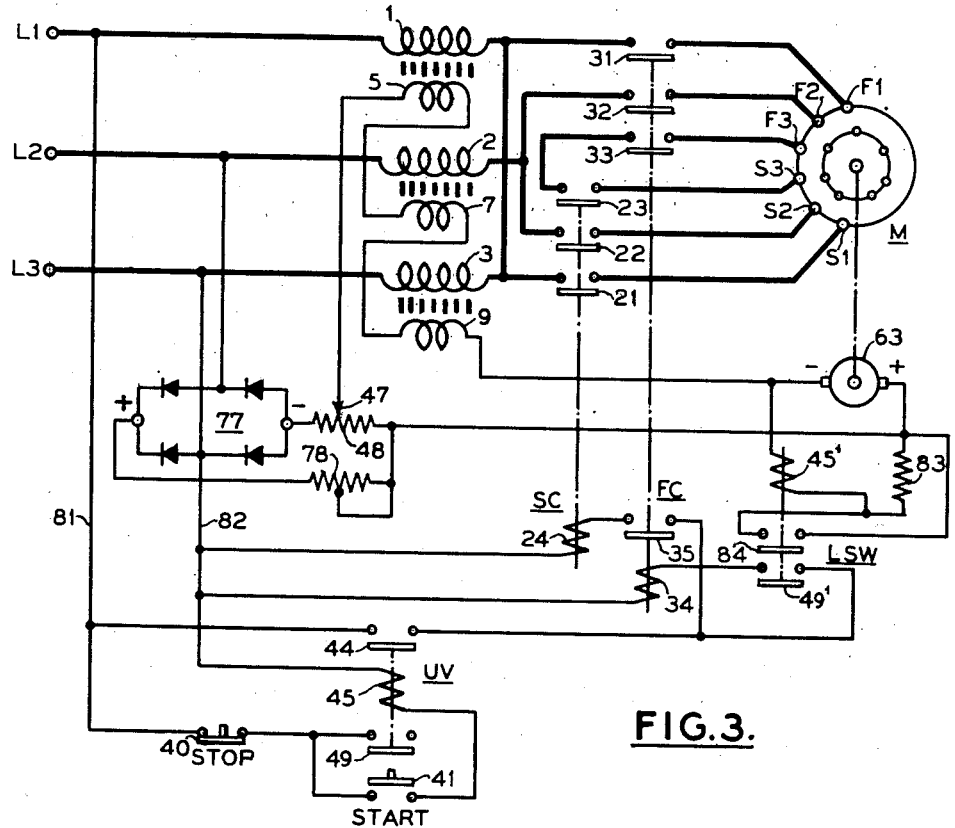
Fig. 3 is the schematic circuit diagram of another control system for two selective synchronous speeds.

Referring to Fig. 1, the illustrated squirrel-cage motor M has two groups of stator windings (not shown) so that it can be operated with one or another number of field poles depending upon whether motor terminals F1, F2, F3 or motor terminals S1, S2, S3 are energized at a time. For instance, when the motor M is energized at terminals F1, F2, F3 it will operate with four field poles, and hence will have a synchronous speed of 1800 R. P. M. at a line frequency of 60 C. P. S. The second set of terminals S1, S2, S3 when energized may produce six poles so that the motor will operate at 1200 R. P. M. If the windings connected to terminals F1, F2, F3 are center-divided, as is the case in various conventional motors of this type, the motor will develop eight poles when energized at terminals S1, S2, S3 and will then have a synchronous speed of 900 R. P. M.

Normally, only one of the two sets of terminals is energized at a time from the line terminals or buses L1, L2, L3 of the alternating-current supply line. The line current then passes through the alternating-current windings 1, 2, 3 of a saturable reactor device SR. Each reactor winding 1, 2, 3 has its saturable iron core equipped with two premagnetizing coils 4 and 5, 6 and 7, or 8 and 9. Coils 4, 6, 8 are connected in series with a current-limiting resistor 11 across the output terminals of a rectifier 12 supplied with alternating current through leads 13, 14 from line terminals L1 and L2. The rectifier 12 drives through coils 4, 6 and 8 an adjusted constant current in order to provide the three saturable reactors of device SR with premagnetizing bias in opposition to the variable premagnetization caused by respective coils 5, 7, 9. The latter coils are connected in the control circuit 15 of the reactor device SR and are supplied with variable control current from across the output terminals 16 and 17 of an amplifier MA. The coils 5, 7 and 9 are the main control coils of the reactor device SR. The change in control current flowing through these coils changes the degree of saturation and hence the effective impedance of the three reactors so that the load current flowing from line terminals L1, L2, L3 to the motor is approximately proportional to the control current in circuit 15.

Which of the two sets of motor terminals F1 to F3 or S1 to S3 is energized at a time depends upon the operating condition of two contactors SC and FC. Contactor SC has three contacts 21, 22, 23 which, when actuated by the contactor coil 24, connect the motor terminals S1, S2, S3 to respective line terminals L1, L2, L3 through the reactor main windings 1, 2, 3. Contactor FC has three main contacts 31, 32, 33 which, when actuated by the contactor coil 34, connect the motor terminals F1, F2, F3 through reactor main windings 1, 2, 3 with line terminals L1, L2, L3. Contactor FC has a normally closed control contact 35 connected in the coil circuit of contactor SC.

The coil circuit of contactor SC is controlled by a normally closed push-button switch 40, a normally open push-button switch 41, and by a relay UV whose coil 42 controls two normally open contacts 43 and 44. The coil circuit of contactor FC is controlled by a limit-switch device which comprises a relay LSW whose coil 45 is shown, by way of example, to be energized from across the direct-current output terminals of constant-voltage rectifier 12. Such energization, however, is dependent upon the setting of a speed control rheostat. This rheostat is shown equipped with a contact segment 46 and with a selectively adjustable slider 47 cooperating with a potentiometer resistor 48. As will be explained below, the selected setting of slider 47 determines the speed at which the motor M will run. When the slider 47 is set for a low speed range, it remains disengaged from the contact segment 46 so that relay coil 45 is deenergized. When the slider 47 of control rheostat 46 is set for a desired speed within an upper speed range, it engaged the segment 46 and thus connects the relay coil 45 across rectifier 12 so that relay LSW picks up and closes its contact 49 which then energizes the coil 34 of contactor FC. Contactor FC when picking up, opens its contact 35 with some delay and then deenergizes coil 24 of contactor SC. Consequently, only one of the contactors FC and SC is active at a time, with the exception of a short transition interval during which both are picked up simultaneously.

As mentioned, the effective impedance of the saturable reactor device SR in the motor circuit depends upon the amount of current supplied to the control circuit 15 from amplifier MA. This amplifier is illustrated as a magnetic amplifier. It is supplied with power at terminals 51 and 52 from line terminals L2 and L3 and comprises two saturable reactors whose respective main windings 53 and 54 are connected in a loop circuit with four rectifier units 55, 56, 57, 58 so as to supply rectified current to circuit 15 through output terminals 16 and 17. The saturable iron core of each reactor in amplifier MA is equipped with a constant bias coil 59 which is shown energized from constant-rectifier 12 through a current-limiting resistor 60. Each core is further provided with a control coil 61. The current flowing through the control coils 61 determines the effective impedance of the main windings 53, 54 and thereby the magnitude of the amplified output current supplied to the control circuit 15.

The amplifier control coils 61 are connected in a mixer circuit 62 which comprises two main sources of voltage. One of these sources is constituted by the taped-off portion of the speed control rheostat 48. This voltage is constant and is determined by the selected setting of slider 47. The second main source of voltage in mixer circuit 62 consists of a tachometer generator 63 driven from motor M so as to supply variable signal voltage proportional to the motor speed. The tachometer voltage is series opposed to the speed-reference voltage across the active portion of control rheostat 48. Consequently, the resultant error voltage is approximately equal to the difference between the adjusted constant speed-reference voltage and the variable speed-signal voltage. When the slider 47 of control rheostat 48 is turned entirely to the left, the speed-reference voltage is a maximum and the motor runs at its highest speed. When the slider 47 is turned entirely to the right, the speed-reference voltage is zero to make the motor run at minimum speed.

When one of the contactors SC, FC is closed and the motor is in operation but runs at a speed other than called for by the reference voltage, a control current flows in the mixer circuit 62 in the direction required to increase the effective saturation of the iron cores in the amplifier MA. This decreases the effective impedance of reactor windings 53, 54 so that the magnetic amplifier passes more current through the control circuit 15 of the saturable reactor device SR. This current increases the degree of saturation of the iron cores in reactor device SR and thus reduces the effective impedance of the reactor main windings 1, 2, 3. More current is now supplied to the motor and causes the motor to accelerate. If the motor runs faster than the speed called for by the reference voltage set by means of the rheostat slider 47, the tachometer voltage is larger than the reference voltage and current flows through the mixer circuit 62 in the opposite direction so as to decrease the degree of saturation of the reactor cores in the magnetic amplifier MA. Consequently, a very small current now flows in the control circuit 15 of the saturable reactor device SR. Under these conditions, the degree of saturation in the cores of device SR is decreased and the effective impedance of the device is increased, thus reducing the amount of current supplied to the motor M. Consequently, the motor slows down. The actual speed at which the motor will run for any setting of the slider 47 is such that the signal voltage of tachometer generator 63 is slightly smaller than the speed-reference voltage by an amount equal to the sum of the corrective voltage across resistor 64 plus the voltage drop in control coils 61 of amplifier MA.

The mixer circuit 62 is shown equipped with a resistor 64 in series with the tachometer generator 63. Resistor 64 is connected across the direct-current terminals of a rectifier 65 energized from the motor terminals. Rectifier 65 impresses upon resistor 64 a slight corrective direct voltage proportional to the terminal voltage of the motor. The function of rectifier 65 and resistor 64 is such as to have the tendency to maintain the terminal voltage of the motor constant. Although this tendency is overpowered by the action of the tachometer generator 63 and the speed-reference voltage from control rheostat 48, it has the effect of stabilizing the regulating performance to minimize oscillations in motor speed.

The operation of the system as a whole is as follows.

For starting the motor, the operator depresses the "start" button 41. This causes relay UV to pick up. Relay UV is an under-voltage relay which permits the system to operate, or to be kept in operation, only if and as long as the voltage of the supply line is above a given minimum value. However, the relay UV also serves the function of starting and stopping the drive system. That is, when the "start" button 41 is depressed, relay UV closes contact 44 and thus energizes the contactor SC. The contactor now closes its contacts 21, 22, 23 and energizes the motor M at terminals S1, S2, S3 for slow-speed operation. The motor now accelerates to a speed determined by the selected setting of slider 47 in control rheostat 48, as explained in the foregoing. When this setting is within a given slow-speed range, the motor continues to be energized at terminals S1, S2, S3. However, when the speed of the motor is changed by displacement of the slider 47, the reference voltage may be such as to demand a speed from the motor which is greater than the synchronous speed obtained with the low-speed stator winding. Slightly before this point is reached, however, the motor is reconnected from the low-speed to the high-speed winding. This is done by the operation of the limit switching device comprising the segment 46 and the relay LSW. When the slider 47 engages the segment 46 so that relay LSW closes its contact 49, the contactor FC is energized and closes its contacts 31, 32, 33. For a short interval of transition, the main contacts of both contactors are closed and both stator windings are energized simultaneously. Shortly thereafter the contact 35 of contactor FC interrupts the coil circuit of contactor SC so that motor terminals S1, S2, S3 are disconnected from the line and the motor continues operating with a reduced pole number as required for high-speed operation.

When the setting of the control rheostat is changed from high speed to a speed below the synchronous value of the larger pole number effective when terminals S1, S2, S3 are energized, the relay 45 drops out and disconnects the coil 34 of contactor FC which then closes the contact 35 shortly before opening the main contacts 31, 32, 33, the contactor SC then becomes operative to energize the motor for slow-speed operation and contactor FC drops out.

The motor is stopped by depressing the "stop" contact 40. This deenergizes the coil 42 of relay UV which then opens its self-holding contact 43 and interrupts the coil circuit of contactor SC at contact 44.

Figure 2:
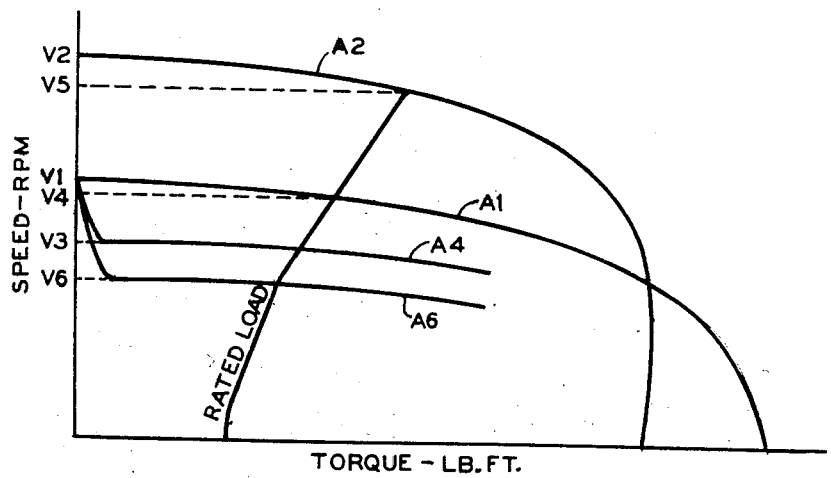
Fig. 2 is a coordinate diagram of speed-torque characteristics explanatory of a system according to the invention.

The speed-torque characteristics shown in Fig. 2 serve to further explain the performance of a system as exemplified by Fig. 1. In Fig. 2, curve A2 represents the four-pole performance of the motor for a synchronous speed V2 of 1800 R. P. M. The low-speed winding of the motor is assumed to have six poles corresponding to a synchronous speed V1 of 12,000 R. P. M. The performance at this speed is represented by curve A1.

If it is desired to control the speed of the motor approximately within a two-to-one speed range, the minimum speed V6 of 740 R. P. M. at which the motor will operate continuously is represented by curve A6. This speed-torque characteristic is obtained by the effect of the impedance control operation of the saturable reactor device SR, although it may also be produced with the aid of other impedance control devices operating substantially on the principle of reducing the motor terminal voltage, or by varying the power dissipated in the secondary circuit if the motor is of the wound-rotor type. The speed obtained in accordance with curve A6 is obtained by energizing the low-speed winding of the motor. The speed V6 differs from the low synchronous speed of 1800 R. P. M. by the value 460 R. P. M. This corresponds to a slip of only 38%. If the same minimum speed were obtained with the aid of the high-speed winding whose synchronous performance is represented by curve A2, then the difference of the minimum speed V6 from the synchronous speed V2 would be 1,060 R. P. M. which amounts to a slip of 59%. The "rotor efficiency" is normally defined as being equal to unity minus slip. Consequently, the rotor efficiency of the drive when operated on the low-speed winding is 62%. In contrast, this efficiency would be 41% if the motor had only one winding corresponding to the high-speed winding. Since, as explained, the losses appear in the rotor circuit as heat, the improvement in efficiency is of considerable importance particularly in cases where a squirrel-cage motor is used.

Another advantage of a system according to the invention is the fact that the stator windings of the motor can be arranged for constant horse-power output such that a greater torque can be obtained on the low-speed winding than on the high-speed winding. This is desirable for many types of applications. Another advantage is the fact that the multispeed motor in a system according to the invention can undergo a "closed-circuit transition" without excessive current disturbance. This is so because during the transition interval the saturable reactor or other impedance device is effective to regulate the motor speed and because an abrupt and considerable change in current supply, as would occur when completely interrupting the current supply during transfer intervals, is prevented. As a result, a stepless speed control is obtainable even during transition from one stator winding to another so that the transients in the speed and torque of the motor are minimized or negligible.

The system shown in Fig. 3 is equipped with a motor which has two sets of stator terminals S1, S2, S3 and F1, F2, F3 connected with respectively different stator windings for selectively operating under low and high synchronous speed conditions respectively. As in the system of Fig. 1, the motor is energized at terminals S1, S2, S3 for low synchronous speed when these terminals are connected with the respective line terminals L1, L2, L3 by the contacts 21, 22, 23 of a contactor SC. The motor will operate under fast synchronous speed conditions when the stator terminals F1, F2, F3 are connected to the line terminals by respective contacts 31, 32, 33 of another contactor FC.

Speed control is effected by a variable impedance device SR which is illustrated symbolically by main reactor windings 1, 2, 3 and saturation control coils 5, 7, 9. No auxiliary bias coils (4, 6, 8 in Fig. 1) are represented in Fig. 3. Although such bias coils may be employed, they are not essential to the invention proper.

In the system of Fig. 3, the control circuit of the saturable reactor device SR is directly impressed by the adjusted speed-reference voltage and by the condition-responsive signal voltage so as to also operate as a mixer circuit. For this purpose, the potentiometer rheostat 48 is connected in the control circuit 79 which also comprises the saturation control windings 5, 7, 9. A tachometer generator 63 driven from motor M is connected in control circuit 79 in series opposition to the voltage tapped-off from potentiometer 48 in accordance with the selected setting of the control slider 47. Potentiometer 48 is connected across the output terminals of a rectifier 77 in series with a calibrating rheostat 78 which serves to adapt the control rheostat for a desired speed range and, once set, need not be adjusted during normal operation of the system. The rectifier 77 is energized by constant voltage from leads 80 and 82 connected to line terminals L3 and L2, respectively.

During operation of this system, the motor is regulated to run at a speed determined by the setting of slider 47 of control potentiometer 48. When the speed of the motor, and consequently the signal voltage of tachometer generator 63, departs from the adjusted constant speed-reference voltage, the resultant error voltage is effective to drive a current in one or the other direction through the reactor control coils 5, 7, 9 so as to change the saturation and effective impedance of reactor windings 1, 2, 3 in the sense needed to establish the desired speed.

The contactor control portion of the system shown in Fig. 3 is largely similar to that described above with reference to Fig. 1, except that in the system of Fig. 3 the transfer from one contactor to the other and hence the pole switching of the motor is effected in dependence upon the actual motor speed rather than upon the setting of the control rheostat. For this purpose, the limit switching device LSW in Fig. 3 is formed by a voltage responsive relay connected across tachometer 63. The relay will respond only when its control coil 45' receives a voltage above a given limit value. This value is reached when the accelerator motor attains a speed slightly below the synchronous speed determined by the energization of stator terminals S1, S2, S3. When relay LSW picks up, it closes at contact 49' the coil circuit of contactor FC thus energizing the motor terminals F1, F2, F3 and thereafter deenergizing the terminals S1, S2, S3. In order to prevent hunting when the motor is called upon to continuously operate at a speed near the lower synchronous speed value, the voltage at which the relay LSW will pick up should be higher than the voltage at which it will drop out. If the relay does not inherently have a sufficient spread of these two critical voltage values, a resistor 83 of a small resistance value may be connected in series with relay coil 45' as illustrated in Fig. 3, and may be shorted by a contact 84 when relay LSW picks up. This has the effect of recalibrating the relay coil circuit so that a desired drop in tachometer voltage must be effective before the relay LSW can drop out.

For starting the motor M the "start" button 41 is to be depressed. This energizes the voltage relay UV which closes a self-holding contact 49 in shunt relation to push button 41 and also energizes the coil 24 of contactor SC between leads 81 and 82 connected to line terminals L1 and L2, respectively. The motor, now energized at terminals S1, S2, S3, accelerates up to the speed value set by means of the control rheostat 48. If this value is close to, or above the lower synchronous speed, the limit relay LSW will pick up as soon as the motor speed reaches a given limit value. This causes the coil 34 of contactor FC to be energized across leads 81 and 82 through closed contacts 44 and 49'. Now the motor is also energized at terminals F1, F2, F3, and shortly thereafter is deenergized at terminals S1, S2, S3 by contactor SC dropping out. Now the motor will further accelerate to the desired speed value at which its performance is regulated for substantially constant speed by the above-described action of the reactor control components.

Figure 4:
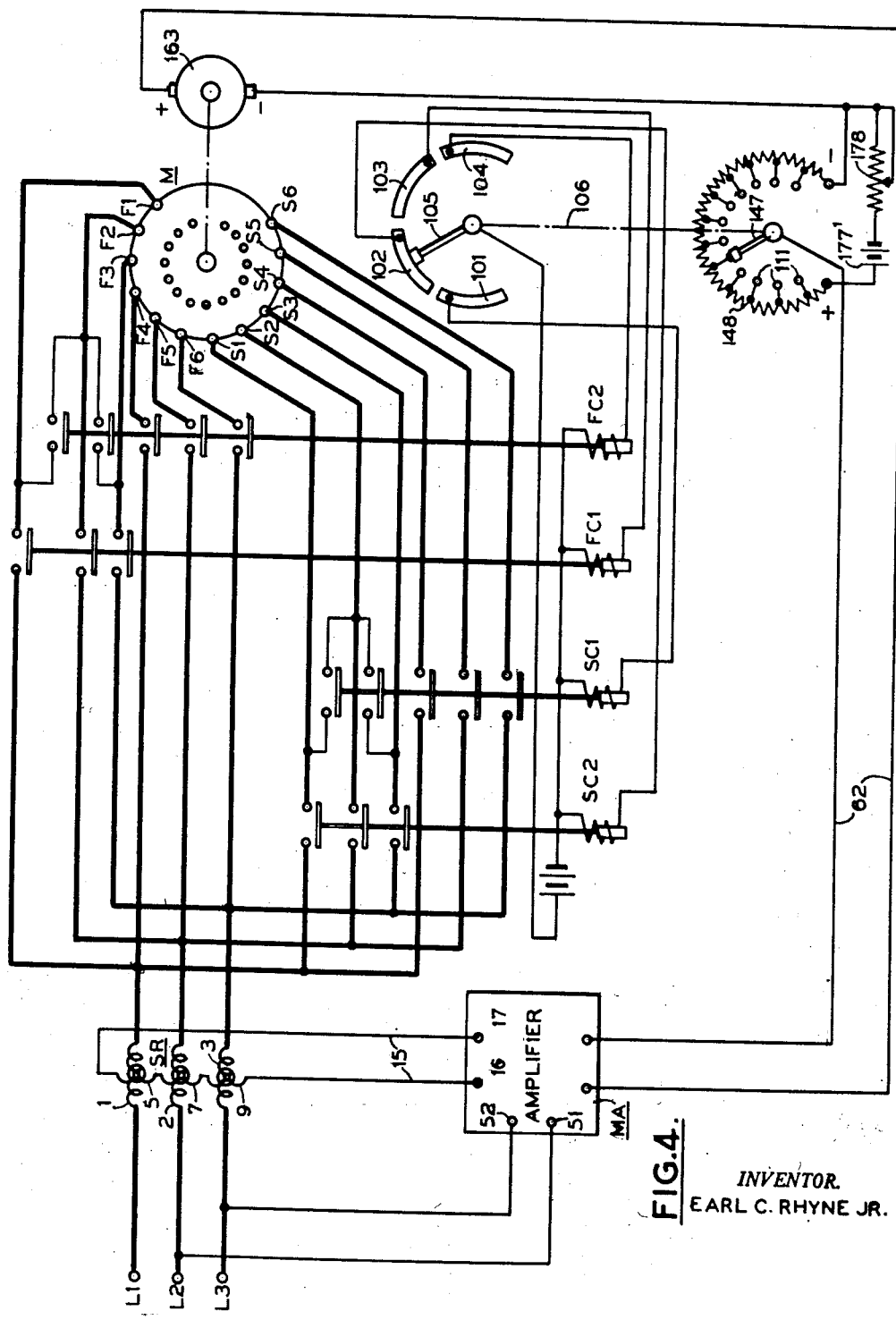
Fig. 4 is the schematic circuit diagram of another control system with a four-speed induction motor.

While in the embodiments of control systems according to the invention described in the foregoing, a multi-speed induction motor is selectively operable for only two different synchronous speeds, the invention is analogously applicable to pole-switchable induction motors designed for any larger number of synchronous speed values. The embodiment illustrated in Fig. 4, for instance, represents schematically a control system for a motor of the squirrel-cage type designed for operation in four selective speed ranges. This motor may have two field windings (not shown) each of which is subdivided so that the motor can be energized either with 32 field poles for minimum synchronous speed, with 16 field poles for operation up to a synchronous speed of twice the minimum value, with 8 field poles for four time the minimum synchronous speed, or with 4 field poles for maximum synchronous speed corresponding to eight times the minimum synchronous speed. The field windings or winding sections are connected to four groups of field terminals denoted by F1, F2, F3 and F4, F5, F6 and S1, S2, S3 and S4, S5, S6. When the motor is to operate at slowest speed, the terminal group S4, S5, S6 is to be energized, while the motor will run at respectively higher speeds when one of the three other terminal groups is energized.

The energized current is supplied from line terminals L1, L2, L3 through a saturable reactor device SR under control by four selectively actuable contactors FC1, FC2, SC1, SC2. The coil circuits of these contactors are energized from a suitable current source under control by a selector switch equipped with four contact segments 101, 102, 103, 104 which cooperate with a movable control contact 105 so that normally only one of the four contactors is picked up at a time. The movable contact member 104 is connected with the slider 147 of the speed control rheostat 148 as is schematically indicated by a dot-and-dash line 106. The member 105 and the slider 147 are preferably mounted on a common shaft of a single control device. The control rheostat 148 is connected across a suitable source 177' of constant voltage, preferably in series with a calibrating rheostat 178. A portion of rheostat 148 tapped-off by the slider 147 is connected in series-opposed voltage relation to a tachometer generator 163 in a mixer circuit 162 which controls the amplifier MA in the manner described with reference to Fig. 1.

In a system of this kind the motor can be controlled and regulated to operate at any desired number of different stable speeds. For instance in the illustrated system the control rheostat 148 is subdivided by taps into twelve selective points of adjustment to permit operating the motor M at twelve graduated speeds. When the slider 147 of control rheostat 148 is set upon any one of the first three steps denoted by 111, the contact member 105 is in engagement with segment 101 so that only the contactor SC1 is picked up to energize the motor at terminals S4, S5, S6 for operation under lowest synchronous speed conditions. The actual motor speed is then dependent upon which particular one of the three speed steps the slider 147 is placed. The resistance of rheostat 148 can be graduated along its length in any desired manner, for instance so that the speed progressively increases by approximately equal amounts when the slider 147 is moved from the first to the second, and from the second to the third step of the group of steps denoted by 111.

When the slider 147 is moved from the third step to the fourth, the contact member 105 passes from segment 101 to segment 102. During a short transition interval both contactors SC1 and SC2 are energized simultaneously, but when the fourth speed step is reached by the slider 147 only contactor SC2 is energized to energize the motor M for the next higher synchronous speed value. In this manner, a "closed-circuit transition" occurs as explained previously in this specification. Further displacement of slider 147 causes the other contactors to become operative in the proper sequence, thus adjusting the synchronous speed value of the motor to the one most favorable for obtaining and regulating the particular speed at which the motor is to run.

It will be apparent to those skilled in the art, upon a study of this disclosure, that my invention is amenable to modification in various respects and may be embodied in control systems with the aid of circuit components other than those specifically illustrated and described, without departing from the essential features of this invention and within the scope of the claims annexed hereto.

I claim:

1. An alternating-current motor control system, comprising a multi-speed induction motor, selective switching means connected with said motor to energize it for different synchronous speeds respectively, an electric circuit member connected with said motor and having a continuously variable electric parameter for controlling the motor speed and having a range of variation corresponding to a speed range substantially from the highest to below the lowest synchronous speed, selectively adjustable control means connected with said member for controlling said parameter throughout said range to maintain the motor speed at a selected value, and connecting means operatively joining said control means with said switching means for causing said switching means to energize said motor for the synchronous speed next above any selected subsynchronous value.

2. An alternating-current motor control system, comprising a multi-speed induction motor having a plurality of terminal groups to operate the motor for respectively different synchronous speeds, power circuit means for said motor comprising current supply means, a plurality of contactors for connecting said respective terminal groups to said current supply means, a variable impedance device forming part of said power circuit means and having control means for varying the impedance of said device, said control means comprising voltage supply means having a voltage indicative of the motor speed, contactor control means, and connecting means operatively joining said contactor control means with said voltage supply means for selectively controlling said contactors in dependence upon said voltage, whereby said motor, when the system is set for a subsynchronous speed, is energized through the terminal group corresponding to the next higher synchronous speed.

3. An alternating-current motor control system, comprising a multi-speed induction motor having a plurality of terminal groups to operate the motor for respectively different synchronous speeds, power circuit means for said motor comprising current supply means, a plurality of contactors for connecting said respective terminal groups to said current supply means, a variable impedance device forming part of said power circuit means and having a voltage-responsive control circuit for varying the impedance of said device to control the motor speed, first voltage supply means of selectively adjustable constant voltage indicative of the desired motor speed, second voltage supply means having a variable voltage responsive to actual motor speed, said two voltage supply means being mutually opposed as regards their respective effects upon said control circuit, and contactor control means connected with one of said two voltage supply means and being dependent upon the voltage thereof for selectively closing said contactors, whereby said motor, when the system is set for a subsynchronous speed, is energized through the terminal group corresponding to the next higher synchronous speed.

4. An alternating-current motor control system, comprising a multi-speed induction motor having a plurality of terminal groups to operate the motor for respectively different synchronous speeds, power circuit means for said motor comprising current supply means, a plurality of contactors selectively connecting said respective terminal groups to said current supply means, a variable impedance device forming part of said power circuit means and having a voltage-responsive control circuit for varying the impedance of said device to control the motor speed, first voltage supply means of normally constant voltage having voltage adjustment means to set said constant voltage to a value indicative of the desired motor speed, condition-responsive second voltage supply means having a voltage indicative of the actual motor speed, said two voltage supply means being connected with said control circuit in opposed effective relation to each other, and contactor control means connected with said adjusting means of said first voltage supply means for controlling said contactors in dependence upon said desired motor speed, whereby said motor, when the system is set for a subsynchronous speed, is energized through the terminal group corresponding to the next higher synchronous speed.

5. In a motor control system according to claim 2, said contactor control means being connected with said second voltage supply means for controlling said contactors in dependence upon the actual motor speed.

6. An alternating-current motor control system, comprising a multi-speed induction motor having a plurality of terminal groups to operate the motor for respectively different synchronous speeds, power circuit means for said motor comprising current supply means, a plurality of contactors for connecting said respective terminal groups to said current supply means, a variable impedance device forming part of said power circuit means and having control means for varying the impedance of said device to control the motor speed, a mixer device having an output circuit connected with said control means and having two opposingly related sources of control voltage, one of said sources having constant voltage and having a selectively adjustable control member to set a desired value of motor speed, said other source having a variable voltage indicative of the actual motor speed, selective switching means connected with said contactors for closing said contactors, said switching means being connected with said control member and dependent upon positional change of said member in the sense required for energizing said motor through the terminal group that corresponds to the synchronous speed next above the speed to which said member is set.

7. An alternating-current motor control system, comprising a multi-speed induction motor having a plurality of terminal groups to operate the motor for respectively different synchronous speeds, power circuit means for said motor comprising current supply means, a plurality of contactors connecting, when closed, said respective terminal groups to said current supply means, a variable impedance device forming part of said power circuit means and having control means for varying the impedance of said device to control the motor speed, a mixer device having an output circuit connected with said control means and having two opposingly related sources of control voltage, one of said sources having adjustable constant voltage, said other source having variable voltage dependent upon motor speed, selective switching means connected with said contactors for closing said contactors, said switching means being connected with one of said sources to be controlled in dependence upon one of said voltages for selectively energizing the motor for the one synchronous speed next above the desired speed, and timing means forming part of said switching means for temporarily closing two of said contactors simultaneously during transition from one to the next synchronous-speed setting of the system.

8. An alternating-current motor control system, comprising a multi-speed induction motor having a plurality of terminal groups to operate the motor for respectively different synchronous speeds, power supply terminals, a plurality of contactors selectively connecting said supply terminals to said respective terminal groups, a saturable reactor device series-interposed between said supply terminals and said contactors and having saturation control coils for varying the motor terminal voltage to control the motor speed, mixer means connected to said control coils and having two differential sources of control voltage, one of said sources having variable voltage responsive to motor speed, said other source having constant reference voltage and having adjustable rheostat means to set said reference voltage in accordance with a desired motor speed, said rheostat means having a continuous speed adjusting range from substantially the highest synchronous speed to below the lowest synchronous speed, and selective switching means connected with said rheostat means to be controlled thereby and connected with said contactors for selectively controlling them, whereby said motor, when the system is set for a subsynchronous speed, is energized through the terminal group corresponding to the next higher synchronous speed.

9. An alternating-current motor control system, comprising a wound-rotor motor having a plurality of stator terminal groups and having a rotor circuit, a saturable reactor device connected in said rotor circuit and having saturation control coils for varying the impedance of said rotor circuit to control the motor speed, mixer means connected to said control coils and having two differential sources of control voltage, one of said sources having variable voltage responsive to motor speed, said other source having constant reference voltage and having adjustable rheostat means to set said reference voltage in accordance with a desired motor speed, said rheostat means having a continuous speed adjusting range from substantially the highest synchronous speed to below the lowest synchronous speed, and selective switching means connected with said rheostat means to be controlled thereby and connected with said contactors for selectively controlling them, whereby said motor, when the system is set for a subsynchronous speed, is energized through the terminal group corresponding to the next higher synchronous speed.

No references cited.